US008868763B2

(12) United States Patent
Tedesco et al.

(10) Patent No.: US 8,868,763 B2
(45) Date of Patent: Oct. 21, 2014

(54) DISK JOCKEY STREAMING SESSIONS

(75) Inventors: Megan Lesley Tedesco, Sammamish, WA (US); Yasser Asmi, Redmond, WA (US); Craig Lichtenstein, Redmond, WA (US); Jeffrey David Henshaw, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 982 days.

(21) Appl. No.: 11/556,672

(22) Filed: Nov. 3, 2006

(65) Prior Publication Data

US 2008/0109550 A1 May 8, 2008

(51) Int. Cl.
G06F 15/16 (2006.01)

(52) U.S. Cl.
USPC ........... 709/228; 709/221; 709/232; 707/610; 725/26

(58) Field of Classification Search
USPC .................. 709/221, 232, 228; 707/201, 610; 725/26
See application file for complete search history.

(56) References Cited

U.S. PATENT DOCUMENTS

| 7,600,690 | B1* | 10/2009 | Gailloux .................. 235/462.46 |
| 7,721,339 | B2* | 5/2010 | Madison et al. ................. 726/27 |
| 2002/0194355 | A1* | 12/2002 | Morita et al. ................. 709/231 |
| 2003/0050058 | A1* | 3/2003 | Walsh et al. .................. 455/426 |
| 2003/0079038 | A1* | 4/2003 | Robbin et al. ................. 709/232 |
| 2003/0182100 | A1* | 9/2003 | Plastina et al. .................... 704/1 |
| 2003/0220970 | A1* | 11/2003 | Komsi ........................... 709/204 |
| 2003/0227478 | A1 | 12/2003 | Chatfield |
| 2004/0039796 | A1* | 2/2004 | Watkins ......................... 709/218 |
| 2004/0064476 | A1* | 4/2004 | Rounds ...................... 707/104.1 |
| 2004/0073924 | A1 | 4/2004 | Pendakur |
| 2004/0103149 | A1 | 5/2004 | Tanigawa et al. |
| 2004/0133467 | A1* | 7/2004 | Siler ............................... 705/14 |
| 2004/0215718 | A1* | 10/2004 | Kazmi et al. .................. 709/203 |
| 2005/0138560 | A1 | 6/2005 | Lee et al. |
| 2006/0008256 | A1* | 1/2006 | Khedouri et al. ............. 386/124 |
| 2006/0009199 | A1 | 1/2006 | Mittal |
| 2006/0123484 | A1 | 6/2006 | Babic et al. |
| 2006/0143236 | A1 | 6/2006 | Wu |
| 2006/0156337 | A1 | 7/2006 | Thelen et al. |
| 2006/0173974 | A1* | 8/2006 | Tang .............................. 709/217 |
| 2006/0184977 | A1 | 8/2006 | Mueller et al. |

(Continued)

OTHER PUBLICATIONS

Gurevich, M., "JamSpace: A Networked Real-Time Collaborative Music Environment," Apr. 2006, delivery.acm.org/10.1145/1130000/1125613/p821-gurevich.pdf?key1=1125613&key2=7218676511&coll=GUIDE&dl=GUIDE&CFID=1139443&CFTOKEN=78757115.

(Continued)

Primary Examiner — Hitesh Patel
(74) Attorney, Agent, or Firm — Micah Goldsmith; Glen Johnson; Micky Minhas

(57) ABSTRACT

A media player may stream media content, such as music, to other media players over a data network connection, for example, a WiFi/802.11 connection. An encounter object may be used to keep a record of each media object transmitted. The encounter object may include information about the transmission itself, such as a date and time when the media object was transmitted and the source and destination media players involved. The encounter object may also include metadata about the media object, such as genre, album, title, and artist, if the media object is a song. The DJ session may also support user interaction, such as sharing library listings, suggesting next plays (requests), and polls.

20 Claims, 7 Drawing Sheets

(56) References Cited

U.S. PATENT DOCUMENTS

2007/0156779 A1* 7/2007 Ho et al. .................. 707/201
2007/0226384 A1* 9/2007 Robbin et al. ............... 710/61
2007/0239849 A1* 10/2007 Robbin et al. .............. 709/217
2007/0299737 A1* 12/2007 Plastina et al. .............. 705/26
2008/0005348 A1* 1/2008 Kosiba et al. .............. 709/231
2008/0089307 A1* 4/2008 Tuijn et al. ................ 370/342

OTHER PUBLICATIONS

Parker et al., "The Java Voter Oriented Listening Environment," cs.kent.ac.uk/pubs/ug/2005/co600.audio/report.pdf.

Bassoli et al. "tunA: Local Music Sharing with Handheld Wi-Fi Devices," medialabeurope.org/research/library/Bassoli_Tuna_2004.pdf.

* cited by examiner

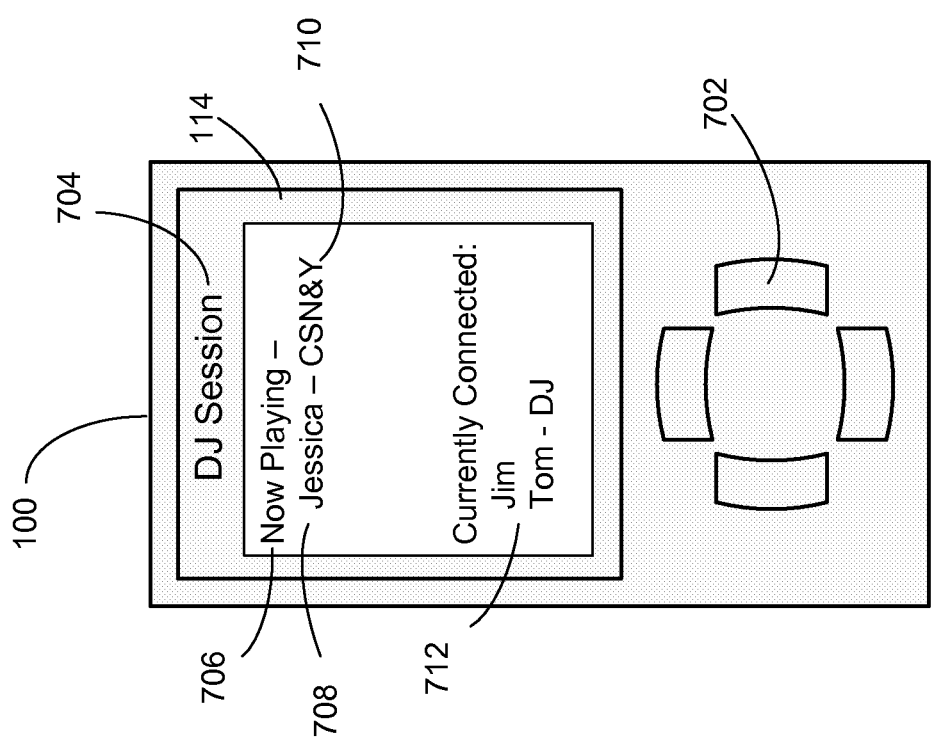

and ing unit 102, a memory 104, a user interface 106, a storage
DISK JOCKEY STREAMING SESSIONS

BACKGROUND

Media devices are in common use among a broad base of users. Radio and television have provided entertainment for generations of users. Portable transistor radios of the 1960s began a trend to smaller and more robust personal media devices including very small devices storing all digital content on both rotating and non-rotating media. Streaming media is available over both wireless and wired networks and may be displayed on cellular telephones and other portable media devices.

Attempts to create community using streaming content may be useful but are also transitory. Once the session is over, a user has no record of content shared or participants. From a marketing perspective, when media content is received and enjoyed, but purchase information is not recorded, an opportunity for a sale may be lost. Similarly, when a user consistently shares media that matches a recipient's tastes, a record of the user's identity may be desirable.

SUMMARY

A media streaming session, or disk jockey session, between a source device and one or more receiving devices may generate an encounter object, used to identify and record the event. The encounter object may include information about the transmission itself, such as a date and time when the media object was transmitted and the source and destination media players involved. The encounter object may also include metadata about the media object, such as genre, album, title, and artist, if the media object is a song. The DJ session may also support user interaction, such as sharing library listings, suggesting next plays (requests), and polls. The encounter object may be also be used in the enforcement for use in synchronizing a portable device with a host partner device, for example, metadata about a media object may be included in the encounter object and, after synchronizing with a host, the metadata may be used to identify a song or video for purchase. Similarly, an encounter object created when receiving a 3-day/3-play media object may be used to prevent streaming of the object to other devices.

BRIEF DESCRIPTION OF THE DRAWINGS

FIG. 7 is an illustration of another screen of the portable media device user interface.

DETAILED DESCRIPTION

Figure 1:
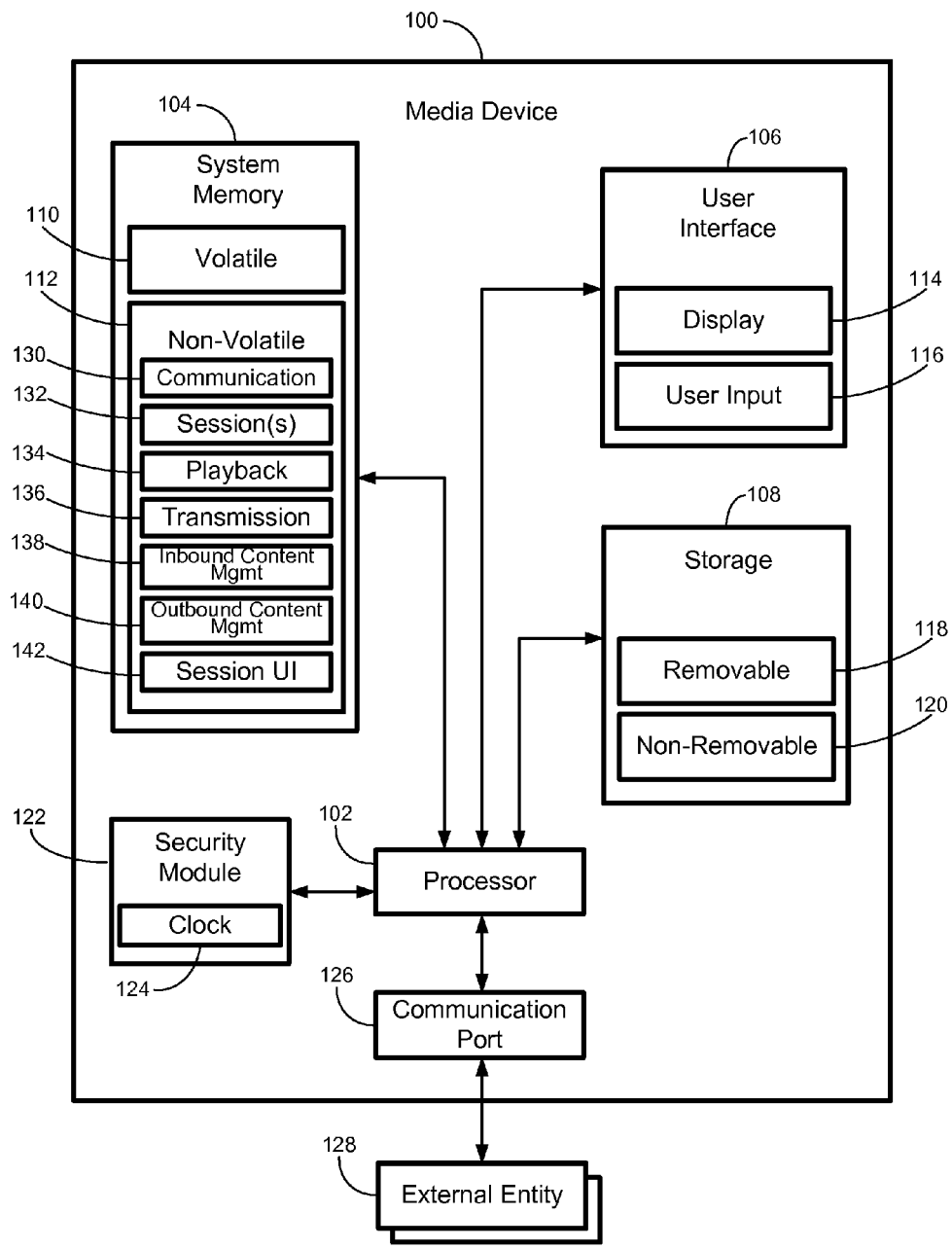
FIG. 1 is simplified and representative block diagram of a portable media device.

FIG. 1 is an illustration of exemplary hardware that may be used for a media device 100 that may provide effective DRM for media objects transferred between devices by managing the device inbox. The media device 100 may have a processing unit 102, a memory 104, a user interface 106, a storage device 108 and a power source (not shown). The memory 104 may include volatile memory 110 (such as RAM), non-volatile memory 112 (such as ROM, flash memory, etc.) or some combination of the two.

The media device 100 may also include additional storage 108 (removable and/or non-removable) including, but not limited to, magnetic or optical disks or tape or any other memory that can be easily rewritten, may keep data for long periods of time when power is removed, and may allow quick and efficient access to data. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data. Memory 104, removable storage 118, and non-removable storage 120 are all examples of computer storage media. Computer storage media includes, but is not limited to, RAM, ROM, EEPROM, flash memory or other memory technology. Any such computer storage media may be part of device 100.

The processing unit 102 may be any processing unit 102 capable of executing computer code to decode media data from a compressed format into a useable form fast enough such that music and video may be played continuously without skips or jumps. When in a portable media device, it may also be useful if the processor 102 efficiently uses power to increase the life of the power source. The processing unit 102 may also be used to execute code to support a user interface and external communications.

The user interface 106 may include one or more displays 114 for both displaying control information and displaying viewable media. The display 114 may be a color LCD screen that fits inside the device 100. User input(s) 116 may include either manual buttons, soft buttons, or a combination of both. Soft buttons may be used when the display 114 includes a touch screen capability. Manual buttons may include re-definable keys with programmable legends.

A security module 122 may be coupled to the processor. The security module 122 may be used to store cryptographic keys used in digital rights management (DRM). The security module 122 may also have specialized hardware or processors for performing cryptographic calculations, such as stream decryption, without burdening the processor 102. Lastly, the security module 122 may include secure memory for storing record data associated with limited use rights for received media objects. The security module 122 may also include a tamper resistant clock 124 for determining expiration periods on licenses. Management of limited use rights for media objects is discussed in more detail below.

The media device 100 may also contain a communications port 126 that allow the device 100 to communicate with external entities 128, such as network endpoints, other media devices, network access points, or a computer used for synchronization. The communication port 126 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

A variety of functions, implemented in logic or software, may be used to support both inbound and outbound DJ sessions. Such functions may include a communication module 130, inbound and outbound session modules 132, a playback module 134, a transmission module 136, inbound 138 and outbound 140 content management modules for creating records regarding streaming content sessions. Additionally, a session user interface 142, incorporating a special user interface and text communication modules may support user interaction related to initiating and supporting DJ sessions, including communication between connected users during a DJ session.

The power source may be a battery that may be rechargeable. The power source may also be a standard battery or an input from a power converter.

In operation, a user may connect to external entities 124 through a variety of network types to include local and wide area networks using any number of communication protocols and standards. For example, a media device may connect to a network implementing any of the Ethernet, ARCNet, FDDI, IEEE 1394, Token Ring, or TCP/IP standards. Additionally, the media device 100 may also connect via a wireless connection, such as an IEEE 802.11 wireless connection. Media devices may connect to each other through a central access point or in an ad hoc fashion. Once connected, the devices may share and transfer data files including media content. A user may receive a media object, including, for example, music, videos, photo slide shows, presentation graphics, real-time translations, closed captioning, or similar information over the communication port 126. In one embodiment, the media object may be sent over an ad-hoc wireless network from the external device 128. To illustrate, the media object may have been purchased for use on the external device 124 and the user of the external device 124 may be entitled to full and unlimited access to that media object using that device. The user of the external device may wish to stream the media object to a user of the media device 100, as well as to other device users, to create a shared experience among connected device users.

While connected, media device 100 may not only transfer files or media content, but may also stream data for immediate, one-time consumption. Streaming data in this fashion, especially streaming audio or video content may be referred to as a disk jockey (DJ) session. A streaming session may be one-to-one, or may be a multicast, that is, one-to-many. Both inbound and outbound DJ sessions may be supported, that is, media content may be sourced from the media device 100 and streamed to a receiving device or may be received from a source device. An encounter object, akin to a journal entry, may be used to record media events, such as streaming session. The encounter object may be a source of information for user convenience services, such as the ability to review titles of songs received or the names of connected devices when songs were streamed. Audio, video, slide shows, photographs or photo albums, presentation graphics, closed captioning, or other objects may also be streamed. The encounter object may also be used to provide metadata about the streamed objects, such as the publisher of a media object, a website where the media object may be obtained, or both.

Figure 2:
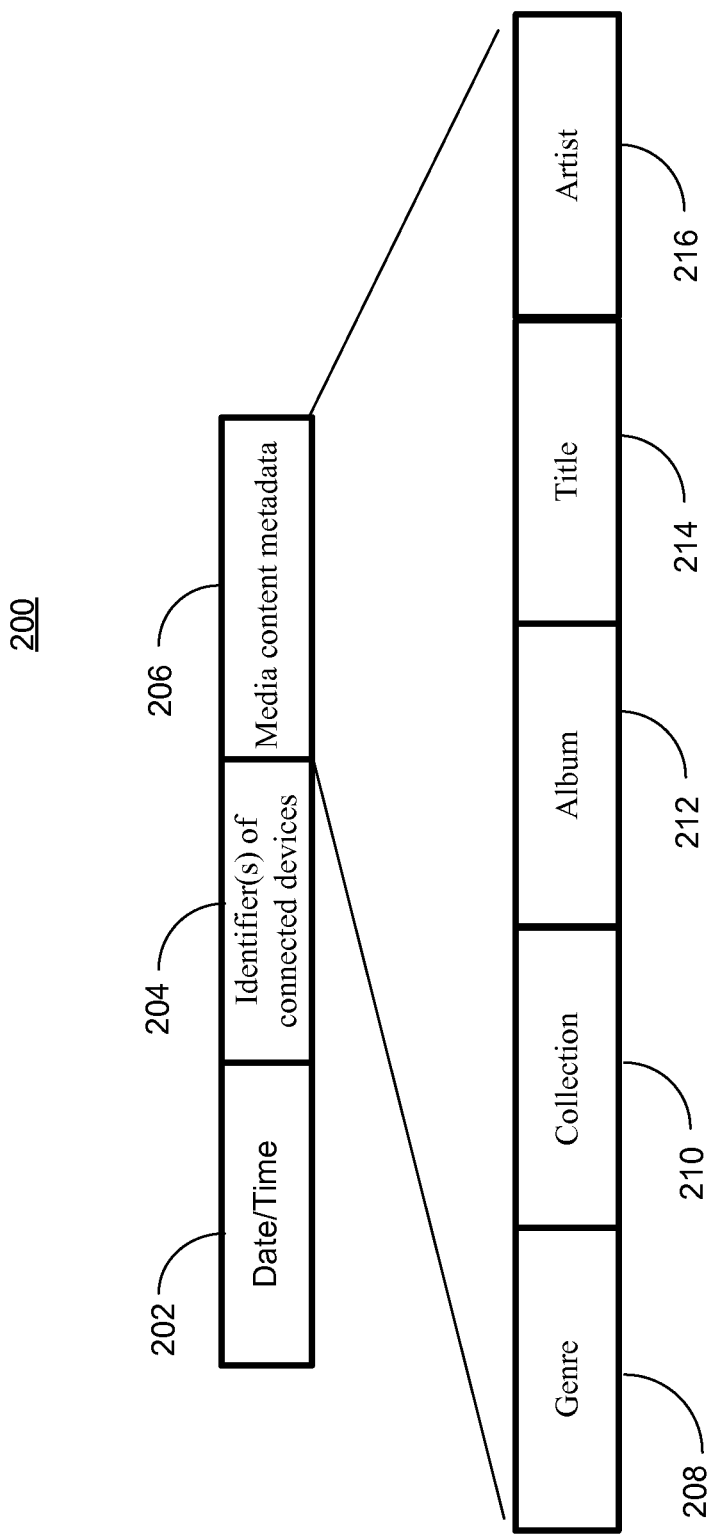
FIG. 2 is a block diagram of an encounter object.

FIG. 2 is a block diagram of an encounter object 200, such as an encounter entry made for each streamed media content item received during a DJ session. The encounter object 200 may include a date/time field 202, an identifier field 204 for logging an identifier for each connected device during the DJ session, and media content metadata 206. The media content metadata 206 may be further divided into a successively more detailed media identifiers. In the exemplary embodiment of FIG. 2, illustrating a media content metadata 206 for a song, the metadata 206 may include a genre 208, for example, classic rock. A collection identifier 210 may define a body of work, such as "The Beatles." An album identifier 212 in this example may be "The White Album" and a title 214 could be "Dear Prudence." The artist identifier 216 may be "The Beatles," which in this example is coincident with the collection identifier 210. In another example, a collection identifier 210 may be "Mozart" and the artist identifier "Sir Georg Solti." The media and associated metadata may be from categories beyond audio or video performances, for example, if a game player is streaming his screen to nearby friends, the media content metadata may be oriented to game genre (war), game title, publisher.

Figure 3:
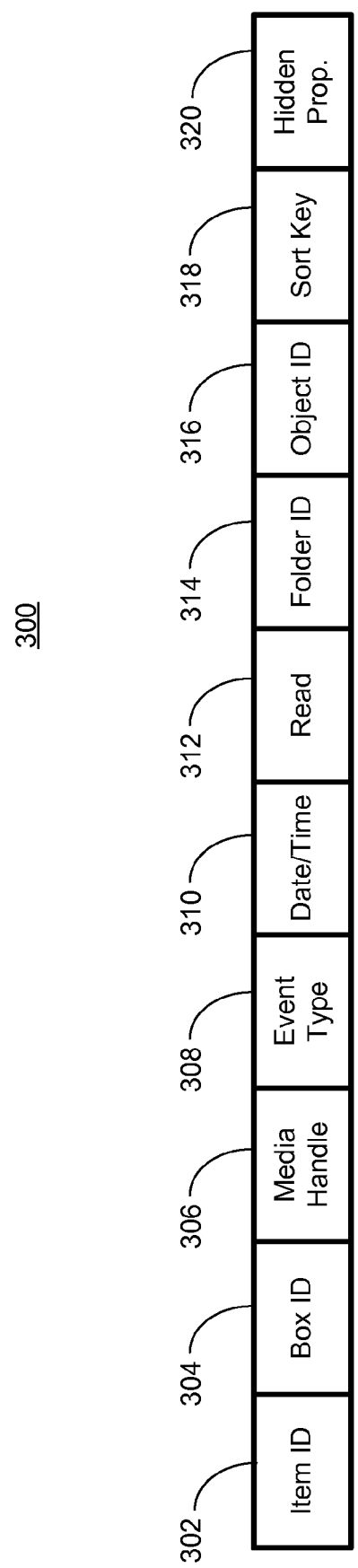
FIG. 3 is a block diagram of an alternate form of an encounter object.

FIG. 3 is illustrates another implementation of an encounter object 300. This version of encounter object may offer more information for management of the information/media identified by the encounter object 300. An item identifier 302 may be a unique identifier, similar to a product bar code to uniquely determine the specific media in question. A box identifier 304 may generically identify a larger grouping, in the last example, an album identifier. A media handle 306 may be a temporary identifier, such as a file system reference for the media as stored on disk. An event type 308 may be used to characterize the event that caused the encounter object to be created. For example, events may include a DJ session, a synchronization event, or a downloaded 3-day 3-play. The date/time 310 may be used to present sequential events to a user and may also be used to calculate remaining time on a 3-day 3-play. A read flag 312 may be used to indicate status as to whether the encounter object 300 has been read by a partner device in a synchronizing operation. The folder identifier 314 may be used to identify the location of the media object on the local disk. An object identifier 316 may be used to identify a media format, for example, MP3, jpeg, Windows Media (.wmv). A sort key 318 may be used to identify a listing order for the object in a collection, for example, rather than list items by title alphabetically, the collection may be sorted by play order on the original album. A hidden property 320 may be used to identify to a user interface manager (not depicted) when an object may be or should not be observable by a user. For example, an expired 3-day 3-play may be blocked from display on the user interface 106, but may be saved for synchronization with a partner device so a journal may be kept of items played. An encounter object for an expired object may also be kept on a media device 100 for preventing abuse by successive attempts to 3-day 3-play an already expired media object.

Figure 4:
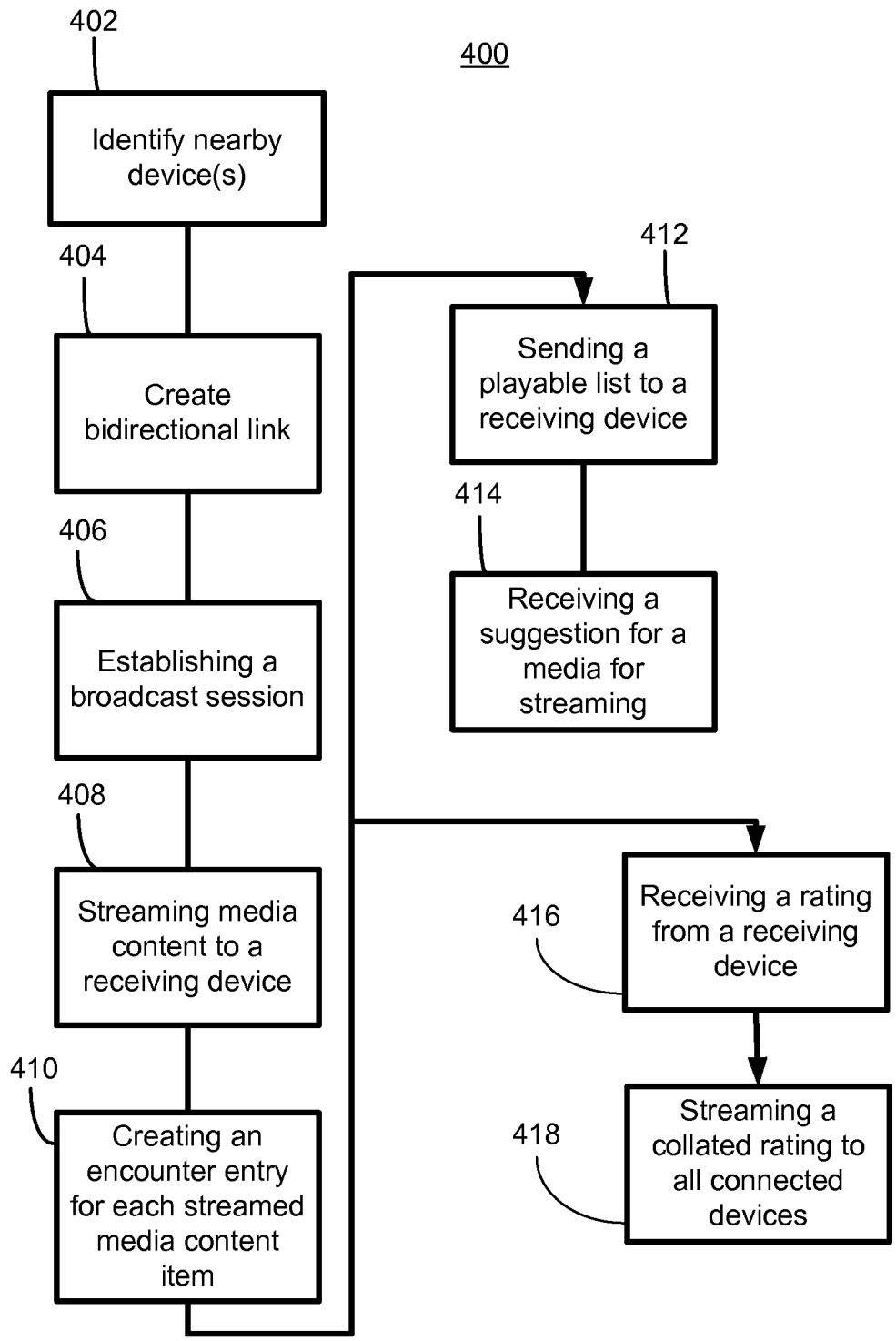
FIG. 4 is a flow chart illustrating a method of hosting a DJ session.

FIG. 4 illustrates a method 400 of hosting a DJ session. A DJ session may be initiated at block 402 by identifying nearby devices. Once a list of nearby devices is determined, processing may continue at block 404 and a bidirectional link may be established between participating devices. The sending device may offer DJ session. The source device may be designated as the DJ, while other devices are listeners or destination devices. The DJ device will source content to the listeners by offering a streaming session at block 406. If a participant wishes to join, the DJ device may be prompted to allow the prospective participant to join the session. At this point, or before, the DJ device may begin streaming content over the streaming session at block 408. At block 410, an encounter object may be created for each element of media content that is streamed between the source and destination devices. The details of the encounter object are discussed above with respect to FIG. 3.

In addition to streaming content between devices, additional opportunities to create and enhance community among the participants may be offered. For example, at block 412, a list of available media may be forwarded to participants. In response, the DJ may receive a list of suggestions or requests. The requests may be stored in the order received and presented to the DJ for consideration.

In another embodiment, recently streamed media may be rated by participants, as indicated at block 416. When compiled, the ratings may be distributed to participants at block 418.

Figure 5:
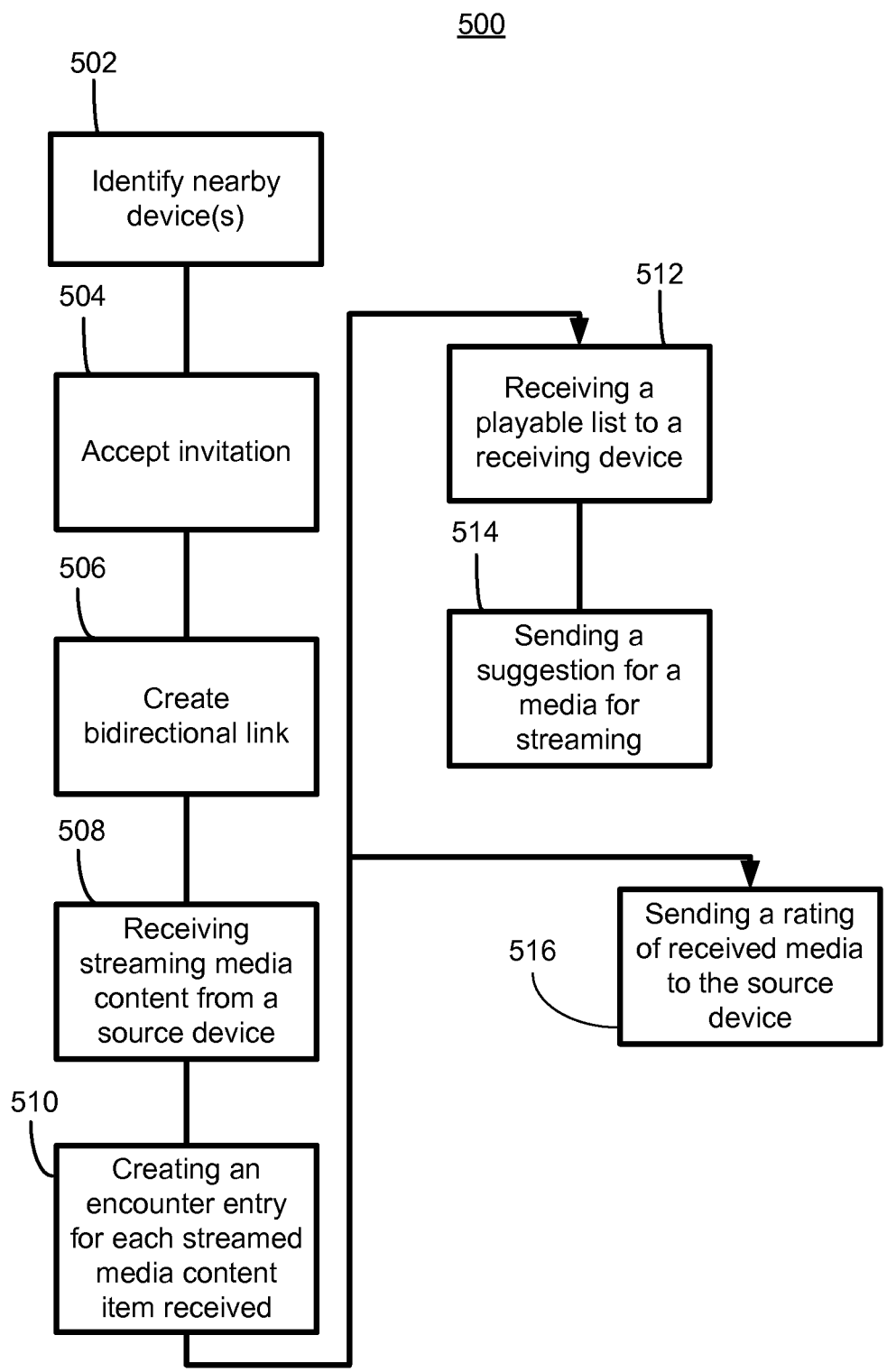
FIG. 5 is a flow chart illustrating a method of participating in a DJ session.

FIG. 5 illustrates a method of participating in a DJ session. At block 502, a participant device may determine that one or more nearby devices is present. At block 504, an invitation to join a DJ session may be received. If the participant chooses to join the session, he or she may accept the offer and a bidirectional link may be established at block 506. Once the link is established, at block 508, the participant may begin receiving streaming media from the source device. At block 510, an encounter object may be created for each element of media content that is received as part of the DJ session.

At block 512, the participant may receive a list of possible songs for playing, in one embodiment, it may be a list of media on the DJ session source device. In another embodiment, the list of available media may include media from all participating devices. At block 514, the participant may identify and forward a media element as a suggestion or request. At block 516, the participant may send a rating for any media content previously received during the DJ session.

Figures 6A, 6B:
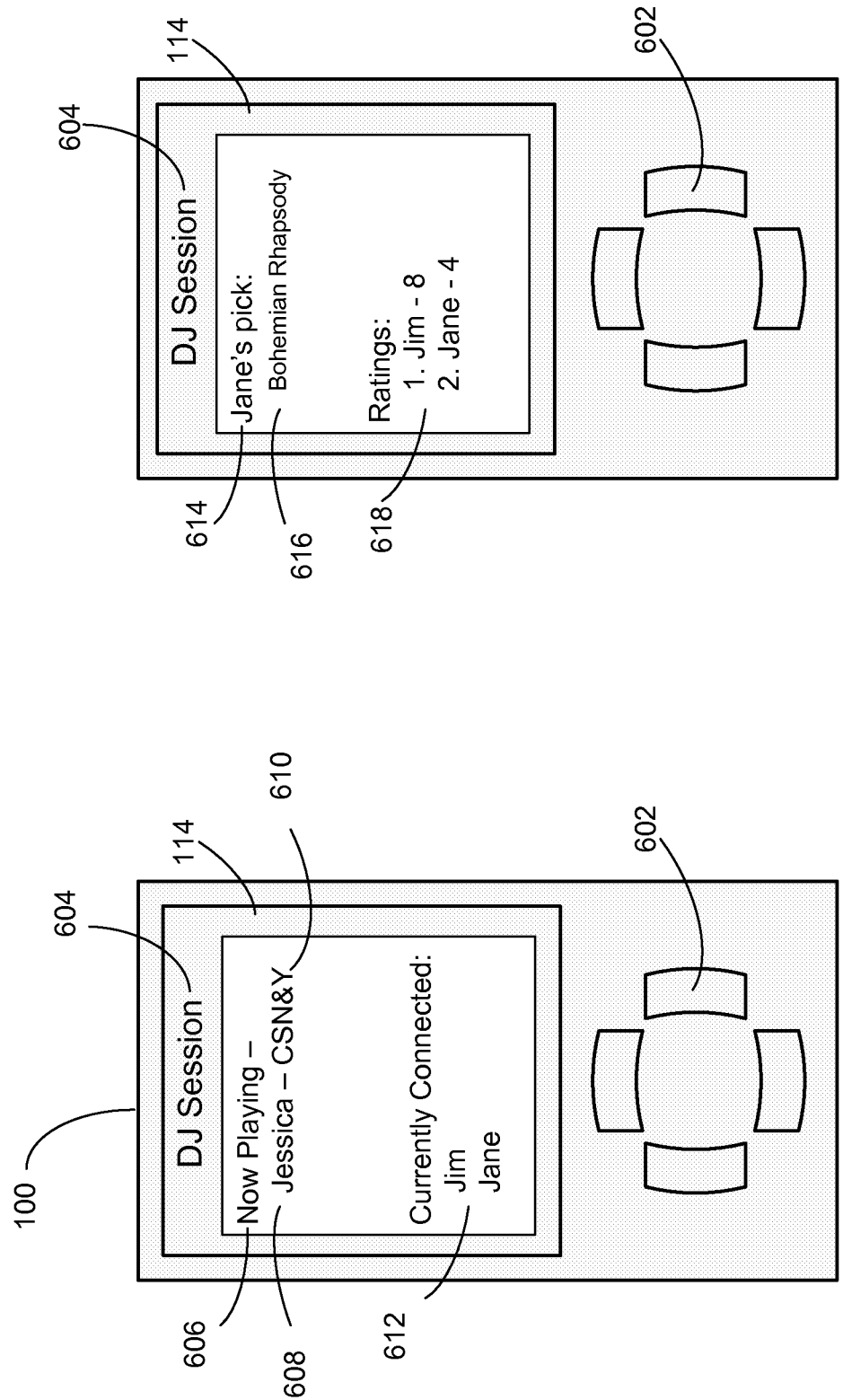
FIGS. 6*a-b* are illustrations of a portable media device user interface.

FIG. 6A illustrates an exemplary screen of a user interface of the source device in a DJ session. The media device 100 has display 114 and user input keys 602. The display 114 may show the media device 100 is in a DJ session 604 and have a Now Playing line 606 with text 608 and 610 indicating the current media element is Jessica by Crosby, Stills, Nash, and Young. Album art or other related data, text or graphical, may also be included. In this example, a list of currently connected devices 612, indicates that Jim and Jane are currently participating in the session.

FIG. 6B illustrates another screen of a user interface of the source device in a DJ session. In this illustration, a request list shows Jane's pick 614 for a future play is Bohemian Rhapsody 616. Also displayed are ratings 618, indicating ratings for the currently playing media content.

FIG. 7 illustrates another screen of a user interface illustrating a user interface of a listener device participating in a DJ session. The media device 100 has display 114 and input keys 702. The display 114 shows the DJ session 704 with now playing text 704 showing song 708 and artist 710. Session status is indicated by text 712, indicating that another participant in the DJ session is Jim and that Tom is the DJ.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

The ability to share media between connected devices and to further build community by sharing lists, requests, and ratings gives the users of a media device not only the ability to play music, media, or games but to interact as not previously possible. The use of internal mechanisms, such as the creation of encounter objects allows users to recall such community-building events after the event has passed.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

We claim:

1. A method comprising:
   initiating a disc jockey (DJ) session at a media device by designating the media device as a DJ device, identifying one or more additional media devices capable of bidirectional communication, and designating the one or more additional media devices as listener devices;
   communicating an offer to join the DJ session to the one or more listener devices;
   receiving an acceptance to join the DJ session from at least one of the listener devices;
   creating a bidirectional communication link with the at least one listener device;
   establishing the DJ session with the at least one listener device over the bidirectional communication link;
   receiving, at the DJ device, at least one of a request, a suggestion, or a rating for a media content item that is available at the DJ device, the request received from the at least one listener device; and
   streaming the media content item based on the at least one of the request, the suggestion, or the rating, from the DJ device, to the at least one listener device over the DJ session for one-time consumption by the at least one listener device so long as a time the media content is allowed to be streamed over the DJ session has not expired, the DJ device having a user interface that concurrently displays a device identifier indicating that the DJ device is in the DJ session, an additional device identifier indicating that the at least one listener device is in the DJ session, and an indication proximate the device identifier of the DJ device that visually distinguishes the device identifier of the DJ device on the user interface from additional device identifiers on the user interface of listener devices in the DJ session, the streaming the media content item effective to cause the at least one listener device to render a listener user interface that displays at least the device identifier of the DJ device and enables a user of the at least one listener device to rate the media content item.

2. The method of claim 1, further comprising:
   receiving a suggested media content item from one of the listener devices for streaming to the at least one listener device over the DJ session.

3. The method of claim 1, further comprising:
sending at least a portion of an encounter entry for the media content item streamed to the at least one listener device during the session to a companion device during a synchronization operation.

4. The method of claim 3, wherein the encounter entry for the media content item comprises a date and time, an identifier of the DJ device, and media content metadata.

5. The method of claim 4, wherein the media content metadata comprises a genre, an album, a title, an artist identifier, and information for purchase of the media content item.

6. The method of claim 4, wherein the encounter entry further comprises an item identifier, a box identifier, a media item handle, an event type, a read flag, a folder identifier for use during synchronization, an object identifier, a sort key, and a hidden property flag.

7. The method of claim 1, wherein the user interface of the DJ device supports text communication with the at least one listener device during the DJ session.

8. A media player device comprising:
one or more modules implemented at least partially in hardware, the one or more modules configured to perform operations comprising:
initiating a disc jockey (DJ) session at a media device by designating the media device as a DJ device, identifying one or more additional media devices capable of bidirectional communication, and designating the one or more additional media devices as listener devices;
communicating an offer to join the DJ session to the one or more listener devices;
receiving an acceptance to join the DJ session from at least one of the listener devices;
creating a bidirectional communication link with the at least one listener device;
establishing the DJ session with the at least one listener device over the bidirectional communication link;
receiving, at the DJ device, at least one of a request, a suggestion, or a rating for a media content item that is available at the DJ device, the request received from the at least one listener device; and
streaming the media content item based on the at least one of the request, the suggestion, or the rating, from the DJ device, to the at least one listener device over the DJ session for one-time consumption by the at least one listener device so long as a time the media content is allowed to be streamed over the DJ session has not expired, the DJ device having a user interface that concurrently displays a device identifier indicating that the DJ device is in the DJ session, an additional device identifier indicating that the at least one listener device is in the DJ session, and an indication proximate the device identifier of the DJ device that visually distinguishes the device identifier of the DJ device on the user interface from additional device identifiers on the user interface of listener devices in the DJ session, the streaming the media content item effective to cause the at least one listener device to render a listener user interface that displays at least the device identifier of the DJ device and enables a user of the at least one listener device to rate the media content item.

9. The media player device of claim 8, wherein the operations further comprise receiving a suggested media content item from one of the listener devices for streaming to the at least one listener device over the DJ session.

10. The media player device of claim 8, wherein the operations further comprise sending at least a portion of an encounter entry for the media content item streamed to the at least one listener device during the session to a companion device during a synchronization operation.

11. The media player device of claim 10, wherein the encounter entry for the media content item comprises a date and time, an identifier of the DJ device, and media content metadata.

12. The media player device of claim 11, wherein the media content metadata comprises a genre, an album, a title, an artist identifier, and information for purchase of the media content item.

13. The media player device of claim 11, wherein the encounter entry further comprises an item identifier, a box identifier, a media item handle, an event type, a read flag, a folder identifier for use during synchronization, an object identifier, a sort key, and a hidden property flag.

14. The media player device of claim 8, wherein the user interface of the DJ device supports text communication with the at least one listener device during the DJ session.

15. One or more computer-readable memories storing instructions thereon that are executable by a computing device to perform operations comprising:
initiating a disc jockey (DJ) session at a media device by designating the media device as a DJ device, identifying one or more additional media devices capable of bidirectional communication, and designating the one or more additional media devices as listener devices;
communicating an offer to join the DJ session to the one or more listener devices;
receiving an acceptance to join the DJ session from at least one of the listener devices;
creating a bidirectional communication link with the at least one listener device;
establishing the DJ session with the at least one listener device over the bidirectional communication link;
receiving, at the DJ device, at least one of a request, a suggestion, or a rating for a media content item that is available at the DJ device, the request received from the at least one listener device; and
streaming the media content item based on the at least one of the request, the suggestion, or the rating, from the DJ device, to the at least one listener device over the DJ session for one-time consumption by the at least one listener device so long as a time the media content is allowed to be streamed over the DJ session has not expired, the DJ device having a user interface that concurrently displays a device identifier indicating that the DJ device is in the DJ session, an additional device identifier indicating that the at least one listener device is in the DJ session, and an indication proximate the device identifier of the DJ device that visually distinguishes the device identifier of the DJ device on the user interface from additional device identifiers on the user interface of listener devices in the DJ session, the streaming the media content item effective to cause the at least one listener device to render a listener user interface that displays at least the device identifier of the DJ device and enables a user of the at least one listener device to rate the media content item.

16. The one or more computer-readable memories of claim 15, wherein the operations further comprise receiving a suggested media content item from one of the listener devices for streaming to the at least one listener device over the DJ session.

17. The one or more computer-readable memories of claim 15, wherein the operations further comprise sending at least a portion of an encounter entry for the media content item streamed to the at least one listener device during the session to a companion device during a synchronization operation.

18. The one or more computer-readable memories of claim 17, wherein the encounter entry for the media content item comprises a date and time, an identifier of the DJ device, and media content metadata.

19. The one or more computer-readable memories of claim 18, wherein the media content metadata comprises a genre, an album, a title, an artist identifier, and information for purchase of the media content item.

20. The one or more computer-readable memories of claim 18, wherein the encounter entry further comprises an item identifier, a box identifier, a media item handle, an event type, a read flag, a folder identifier for use during synchronization, an object identifier, a sort key, and a hidden property flag.

* * * * *